United States Patent [19]
Lee

[11] Patent Number: 6,144,378
[45] Date of Patent: *Nov. 7, 2000

[54] SYMBOL ENTRY SYSTEM AND METHODS

[75] Inventor: Wai On Lee, Kirkland, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/797,723

[22] Filed: Feb. 11, 1997

[51] Int. Cl.[7] .................................................. G06F 3/00
[52] U.S. Cl. .......................... 345/339; 345/347; 345/352
[58] Field of Search .................................. 345/339, 347, 345/348, 352, 353, 354, 357, 327, 128, 141

[56] References Cited

U.S. PATENT DOCUMENTS

| | | | |
|---|---|---|---|
| 5,539,479 | 7/1996 | Bertram | 348/564 |
| 5,543,818 | 8/1996 | Scott | 345/168 |
| 5,581,670 | 12/1996 | Bier et al. | 345/326 |
| 5,596,699 | 1/1997 | Driskell | 345/352 |
| 5,689,667 | 11/1997 | Kurtenbach | 345/146 |
| 5,701,424 | 12/1997 | Atkinson | 345/353 |
| 5,721,853 | 2/1998 | Smith | 345/353 |
| 5,745,717 | 4/1998 | Vayda et al. | 345/352 |
| 5,790,115 | 8/1998 | Pleyer et al. | 345/327 |
| 5,790,820 | 8/1998 | Vayda et al. | 345/352 |
| 5,798,760 | 8/1998 | Vayda et al. | 345/352 |
| 5,805,167 | 9/1998 | Van Cruyningen | 345/353 |
| 5,828,360 | 10/1998 | Anderson et al. | 345/146 |

FOREIGN PATENT DOCUMENTS 860 765 A1 8/1998 European Pat. Off. .

OTHER PUBLICATIONS

Brian Johnson & Gary Rapps, Cyclops: A One Button Aplha–Numeric Keypad, Motorola Inc. Technical Developments, vol. 15, May 1992, pp. 49–56.

Don Hopkins, The Design and Implementation of Pie Menus, Dr. Dobb's Journal, No. 12, pp. 16, 18, 20–22, 24, 26 94, Dec. 1991.

Expandable Targets For Efficient Selection Via A Screen Curser, IBM Technical Disclosure Bulletin, vol. 35, No. 3, Aug. 1992, pp. 438–439.

Extended Pie Menu, IBM Technical Disclosure Bulletin, vol. 37, No. 02B, Feb. 1994, p. 397.

*Primary Examiner*—Crescelle N. Dela Torre
*Attorney, Agent, or Firm*—Lee & Hayes, PLLC

[57] ABSTRACT

A symbol entry system in accordance with the invention includes a graphical display surface, a handheld remote command unit, and a symbol entry tool displayed on the graphical display surface. The symbol entry tool includes a symbol entry region and a symbol chart at least partially surrounding the symbol entry region. The symbol chart shows a plurality of symbols. A visible focus is responsive to commands given by the user through the handheld remote command unit, so that a user can move the focus to a particular symbol in the symbol chart and select such a symbol for entry in the symbol entry region. Only a subset of the symbols are visible on the graphical display surface at any particular time. Generally, the subset includes those symbols nearest the current position of the focus.

31 Claims, 7 Drawing Sheets

SYMBOL ENTRY SYSTEM AND METHODS

TECHNICAL FIELD

This invention relates to on-screen symbol entry systems in which limited input keys are available for specifying symbols.

BACKGROUND OF THE INVENTION

There are many computer-like devices that have no keyboards but still require text entry. One example of such a device is a so-called "Internet TV" device that enables a user to browse the World Wide Web of the Internet using a television and a simple infrared (IR) remote control. Another example is a video game device having limited input controls. Both of these devices are used in conjunction with CRT's or other two-dimensional graphical displays, but have no keyboards.

Typically, control buttons available to the user are limited to directional control keys and some variation of an "action" key. The directional control keys are used to move a cursor or focus to various locations on a display, and the action key is used to select an action corresponding to the cursor or focus location.

FIG. 1 illustrates one method of text entry that utilizes a "spin dial" 10. A spin dial has a small box 11 containing a symbol that can be changed by the user. Up and down arrows 12 and 13 are positioned on the top and bottom of the box. The user can position a cursor over the up and down arrows and press the action key to change the displayed symbol. For instance, pressing the action key when the cursor is positioned over the up arrow changes the displayed symbol to the next in a sequence of symbols—from A to B, for example. Similarly, pressing the action key when the cursor is positioned over the down arrow changes the displayed symbol to the preceding symbol in the sequence.

This method of text entry is easily learned and consumes little screen space. However, it can be inconvenient since scrolling to a particular character might take quite some time. Particularly, this method does not allow for skill development—it does not allow a user to develop techniques for shortening the entry process.

FIG. 2 illustrates another popular method of text entry, utilizing a "virtual keyboard" 15. The virtual keyboard is actually an on-screen representation of a conventional QWERTY keyboard such as implemented in typewriters and computer keyboards. To select a particular character, the user moves the cursor to that character and presses the action key. A "done" key indicates the end of text entry.

This method has the advantage that a user, with time, can learn the positions of the symbols and can thus shorten the text entry process. However, the virtual keyboard occupies a very large amount of the screen, and thus obscures other information that might need to be displayed. In addition, the distance between characters is large, and very large cursor movements are therefore required to enter strings of text.

SUMMARY OF THE INVENTION

The invention addresses the shortcomings of the prior art with a symbol chart that is displayed in a circular area around an area in which it is desired to enter a symbol. This arrangement is much more compact that the QWERTY layout of FIG. 2, while also allowing a user to learn the positions of different symbols and to thus shorten the effort required to enter any particular character. Furthermore, this arrangement avoids any dissociation of the text entry location from the process of selecting the text.

The user moves a focus among the symbols of the chart. A viewport is constructed that includes those symbols nearest the focus. Generally, only the symbols within the viewport are visible at any particular time. The viewport is implemented to follow the focus around the symbol chart, and to expand radially as the focus moves away from the center of the chart.

DETAILED DESCRIPTION OF THE INVENTION

Figure 1:
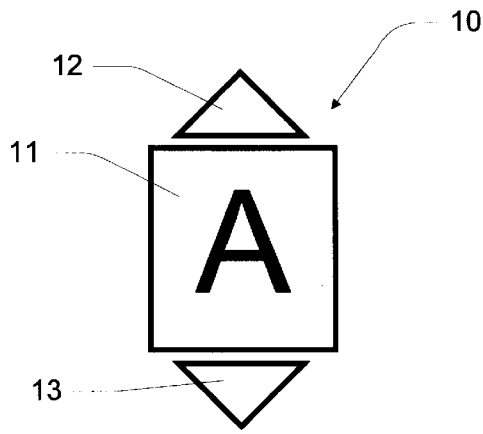
FIG. 1 shows a prior art spin dial.
Figure 2:
FIG. 2 shows a virtual keyboard as used in the prior art.
Figure 3:
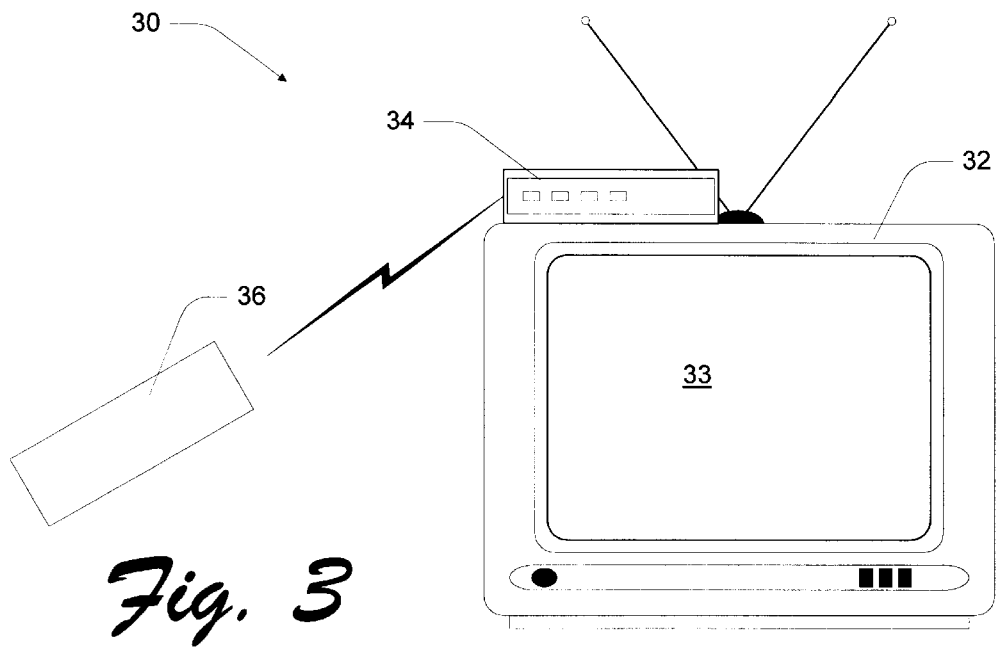
FIG. 3 shows a system in accordance with the invention.

FIG. 3 shows a computer-based video system in accordance with one embodiment of the invention, generally designated by reference numeral 30. Video system 30 includes a CRT or other display unit 32 having a graphical display surface 33, and an associated control unit 34. A remote, handheld command unit such as an infrared (IR) wireless remote control 36 is configured to send signals to control unit 34 in response to a user pressing buttons or keys.

In the described embodiment of the invention, display unit 32 is a color television receiver. Control unit 34 is one of a number of different microprocessor-based units that provides video to display unit 32. For example, control unit 34 might be a set-top box that receives cable or satellite television broadcasts. As another example, control unit 34 might be a video game unit. Alternatively, control unit 34 might be a minimally-configured computer that is connected to the Internet (by a modem, for example), having browser software for allowing a user to access, view, and "browse" the Internet's World Wide Web in conjunction with display unit 32 and wireless remote control 36. Each of these devices can require textual input from a user.

Figures 4, 5:
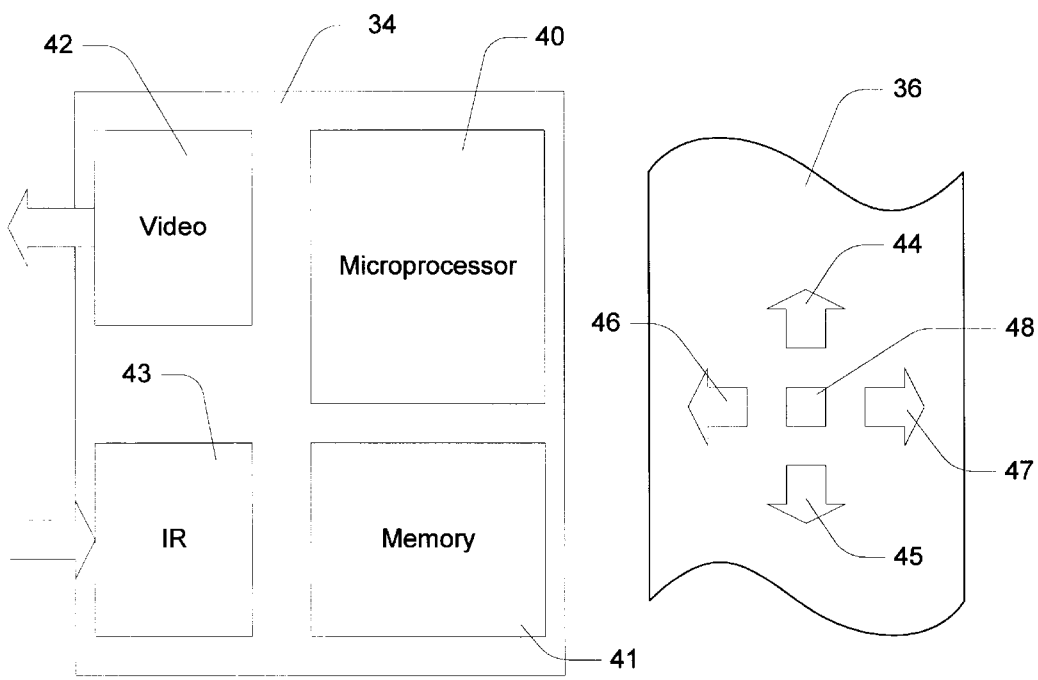
FIG. 4 is a simplified block diagram of a control unit 34 in accordance with the invention.
FIG. 5 shows pertinent focus movement keys of a remote control unit in accordance with the invention.

FIG. 4 shows basic components of an exemplary control unit 34. The control unit includes a microprocessor 40 and associated memory 41. Programs and data are stored in memory 41, to be accessed and executed by microprocessor 40. Memory 41 comprises conventional electronic memory such as ROM, RAM, PROM, EPROM, EEPROM, and the like. Memory 41 might also include magnetic or optical-based memory such as floppy disks, hard disks, CD-ROMs, etc. The methodological steps described below are performed by instructions that are stored on some such type of computer-readable memory or media and executed by microprocessor 40.

In addition to microprocessor 40 and memory 41, control unit 34 includes various interface components. In this case, such interface components include a video subsystem 42 that can be instructed or programmed by microprocessor 40 to present characters and graphics on display surface 33. In most embodiments, the video subsystem will allow bit-mapped images to be displayed on display surface 33. A bit-mapped image consists of a two-dimensional array of elements or pixels, each of which can be a different color and/or intensity.

Control unit 34 also includes an infrared (IR) receiver 43 for receiving commands and keystrokes from remote control 36.

Other types of remote control units might be used in place of the IR unit shown, although the invention is primarily concerned with environments in which alphabetic and/or numeric keys are unavailable.

FIG. 5 shows cursor or focus movement keys of remote control 36 that are pertinent to the invention. They include an up key 44, a down key 45, a left key 46, a right key 47, and an "action" or "enter" key 48. Remote control 36 might also include a plurality of other buttons or keys that are not shown. Pressing a key on remote control 36 causes a code to be transmitted, and to be received at IR receiver 43 of control unit 34.

The technology for generating and displaying bit-mapped images in conjunction with a graphic display unit such as a television receiver or other CRT is well-known, as is the implementation and use of remote control devices in conjunction with video devices.

Control unit 34 is programmed to implement a symbol entry system that includes display unit 32 and remote control 36. Specifically, the microprocessor of control unit 34 is programmed to implement a symbol entry tool that facilitates user entry of symbols.

Figure 6:
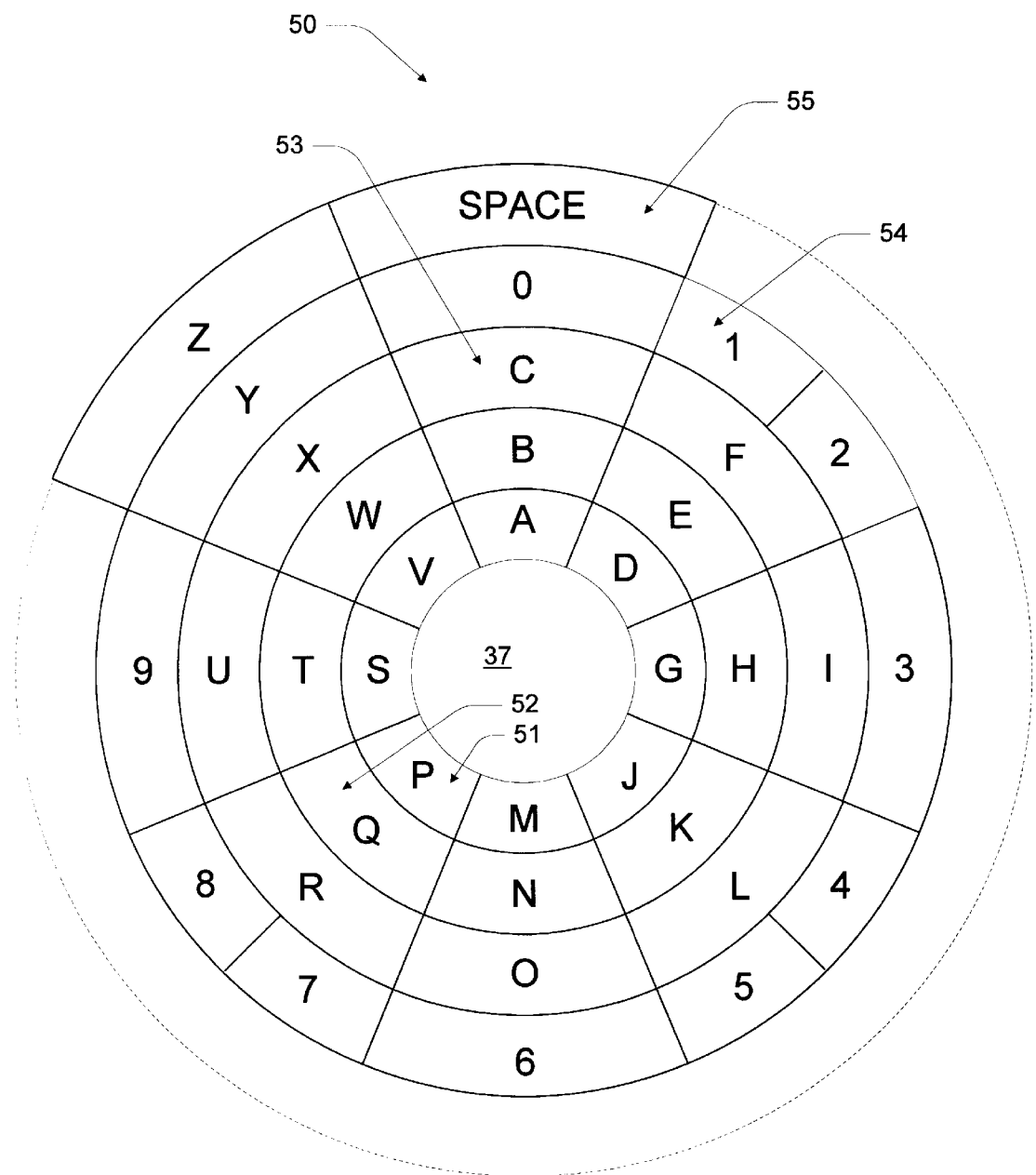
FIG. 6 shows a symbol entry tool in accordance with the invention.

A symbol entry tool in accordance with the invention is shown in FIG. 6. It comprises a symbol chart 50 displayed on display surface 33 of FIG. 3. The symbol chart has a plurality of symbols that can be chosen or selected by a user by issuing commands through remote control 36. In this case, the symbols are alphanumeric characters including the "space" character. The symbols of the chart at least partially surround a symbol entry area 37 that is at the approximate center of the chart. Preferably, the symbol chart and its symbols completely surround the symbol entry area.

The chart is arranged generally as rings of symbols that are approximately concentric about a common approximate center of the symbol chart, extending from a first, inner ring 51 to a fifth, outer ring 55. Inner first ring of symbols 51 includes the "A", "D", "G", "J", "M", "P", "S", and "V" characters. A surrounding second ring of symbols 52 includes the "B", "E", "H", "K", "N", "Q", "T", and "W" characters. Other characters are arranged in third and fourth rings 53 and 54 that surround the first and second rings. Fifth, outer ring 55, actually a partial ring containing only the "Z" and "space" characters, is at the outermost portion of the chart. Symbol entry area 37 is positioned within the innermost ring 51. Symbol entry area 37 surrounds or overlays the display area where a symbol is to be entered by the user. The symbol rings are approximately concentric about the symbol entry region.

The symbols can also be described as forming eight radial spokes extending from the center of the chart. The first spoke, extending vertically upward from the center, contains symbols "A", "B", "C", "0", and "space". Other spokes in the clockwise direction contain subsequent characters and numbers. Three of the spokes are sub-divided at the outer ring to contain more than one number.

Other assignments of symbols to chart positions are of course possible and may be preferable in some situations. Somewhat different overall layouts might also be used while still retaining significant features of the invention as recited in the claims which follow.

Character selection from the symbol chart is accomplished by moving a visible focus among the symbols in response to commands given by the user through remote control 36, and by pressing action key 48 when the focus is over the desired symbol.

While all the symbols of chart 51 are shown in FIG. 6, only a subset of symbols is shown at any one time in the preferred embodiment of the invention. This subset corresponds generally to those symbols that are near the focus. The subset changes as the focus moves.

Figure 7:
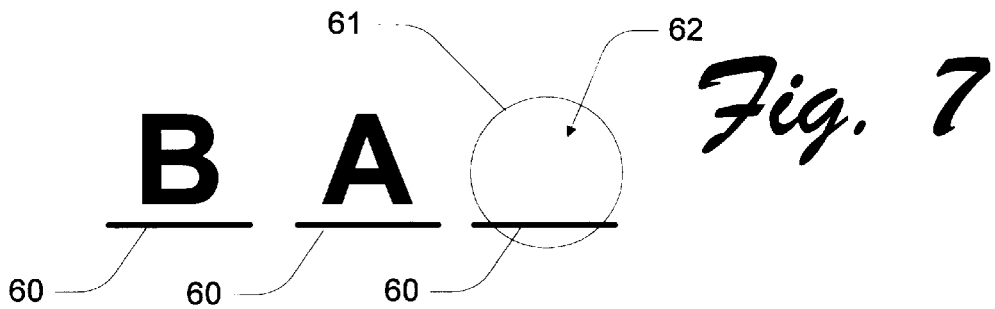
FIGS. 7–17 illustrate operational aspects of the symbol entry tool shown in FIG. 6.

The specific behavior of the symbol entry tool is illustrated more clearly in FIGS. 7–17. FIG. 7 shows a series of symbol positions that are to be filled in by a user. An underscore 60 indicates each position at which the user can enter a symbol. In this case, the user has already entered the letters "B" and "A". A focus ring 61 is positioned around a character position 62, indicating that the user can enter a symbol at this position. Focus ring 61 can be moved between character positions using the focus movement keys of remote control 36.

Figure 8:
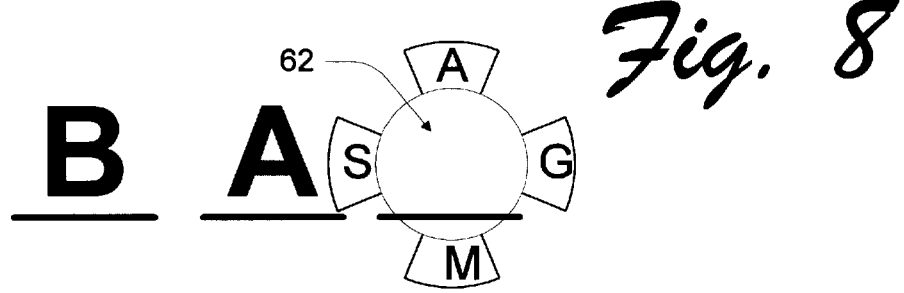

The user opens or initiates the symbol entry tool by pressing action key 48. The result is shown in FIG. 8. Four symbols from the first, inner ring 51 of the symbol chart appear around symbol entry area 62. The user can focus on any one of these symbol by pressing focus movement keys. Pressing up key 44 positions a focus on the "A" symbol; pressing down key 45 positions a focus on the "M" symbol; pressing right key 47 positions a focus on the "G" symbol; and pressing left key 46 positions a focus on the "S" symbol.

Figure 9:
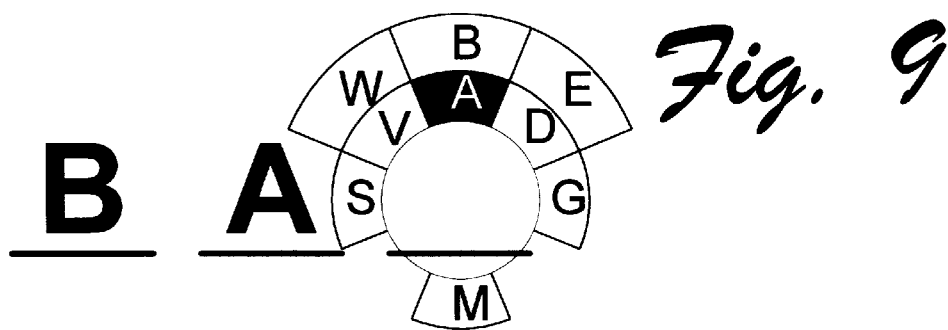

FIG. 9 shows the result of pressing up key 44. One result is that a visible focus appears at the "A" symbol (indicated in the drawings by a white symbol on a black background). Another result is that more symbols are made visible. Specifically, an arc of symbols including "W", "B", and "E" appears. In addition, "V" and "D", which neighbor "A" in first ring 51, are made to appear. The user can now move the focus to any of these visible symbols using the focus movement keys.

Once the symbol entry tool has been initiated, the focus responds to user commands to move among the visible symbols. However, only a subset of the symbols is visible at any given time. Generally, the visible subset of symbols includes the symbols that are near the focus. More specifically, arcs of the rings of symbols are displayed progressively from inner ring 51 to outer ring 55 as the focus moves outward. In addition, the "A", "G", "M", and "S" symbols are always included in the visible symbol subset.

Figure 10:
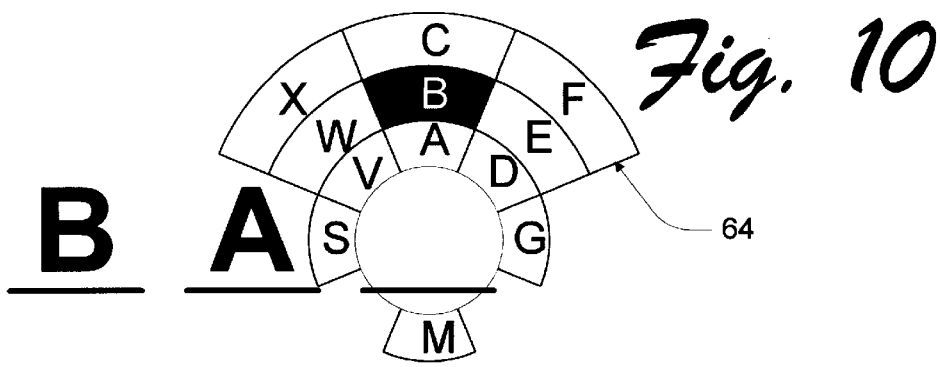
Figure 11:
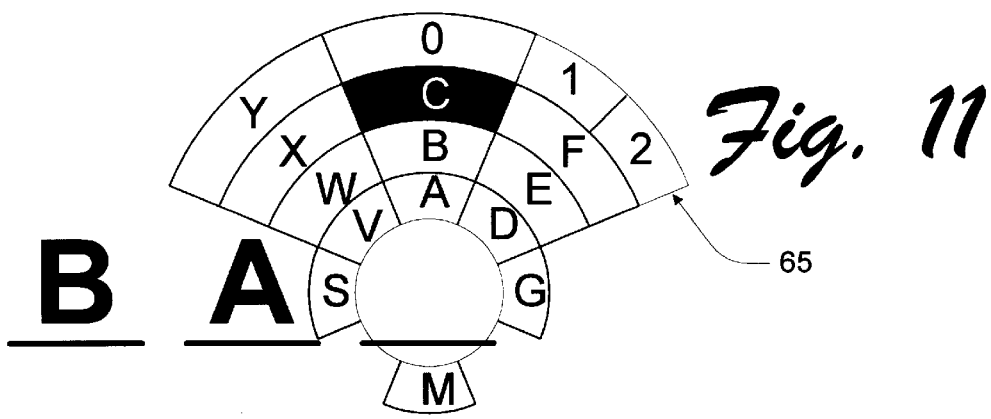
Figure 12:
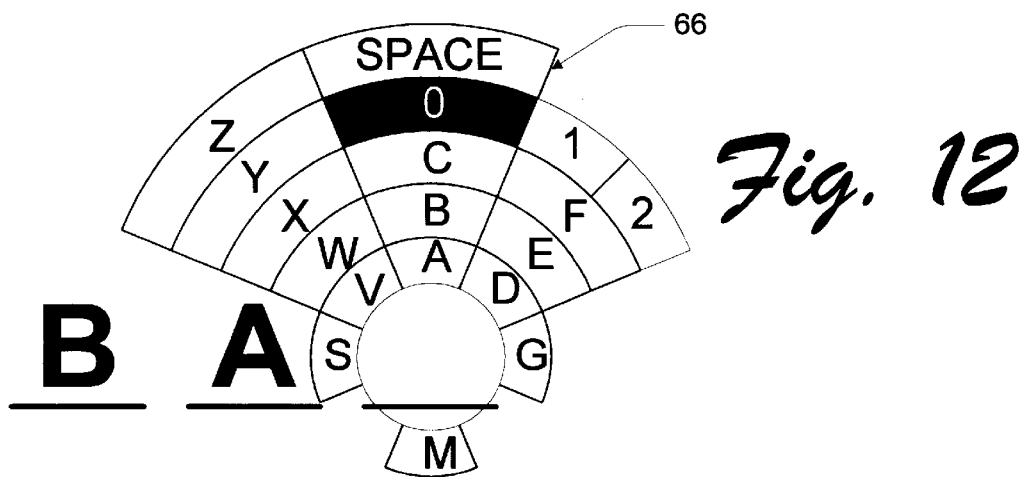

The symbol entry tool allows outward and inward movement of the focus. FIG. 10 shows the result of moving the focus outward from its previous position in FIG. 9, using the up key 44 of remote control 36. The focus is now on the "B" character, and an arc 64 of ring 53 appears (including the "X", "C", and "F" symbols). Pressing the up key again moves the focus to the "C" character, causing an arc of ring 65 to appear as shown in FIG. 11. Pressing the up key yet again moves the focus to the "0" character as shown in FIG. 12, making an arc 66 of outer ring 55 appear. Pressing the down key from any of these positions moves the focus back or inward among the symbols.

Figure 13:
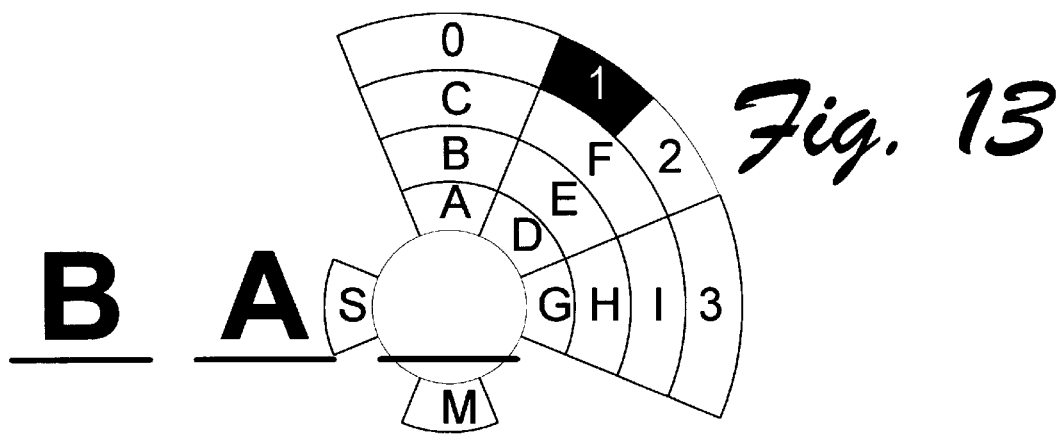

The symbol entry tool also allows movement of the focus around the symbol rings using the focus movement keys of remote control 36. From the "0" character, for example, the user can press the right key 47 to move the focus in the clockwise direction around ring 54 to the "1" character (FIG. 13). In response, the visible subset of symbols changes or rotates to follow the focus.

The symbol entry tool can be described as having a wedge-shaped viewport that expands radially outward as the focus moves outward, thus displaying progressively more symbols (from inner ring 51 to outer ring 55) as the focus moves away from the symbol entry area. Similarly, the viewport contracts radially as the focus moves back inward. The viewport additionally revolves around the center of the symbol chart to follow the focus as the focus moves around the concentric rings. The viewport includes three spokes of the symbols, with the center spoke coinciding with the current position of the focus. The displayed subset of symbols includes those symbols within the viewport.

Figure 14:
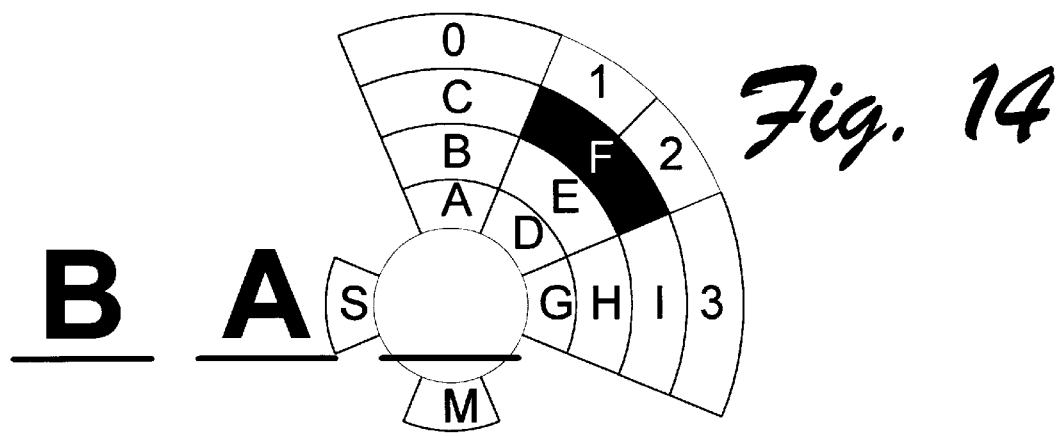
Figure 15:
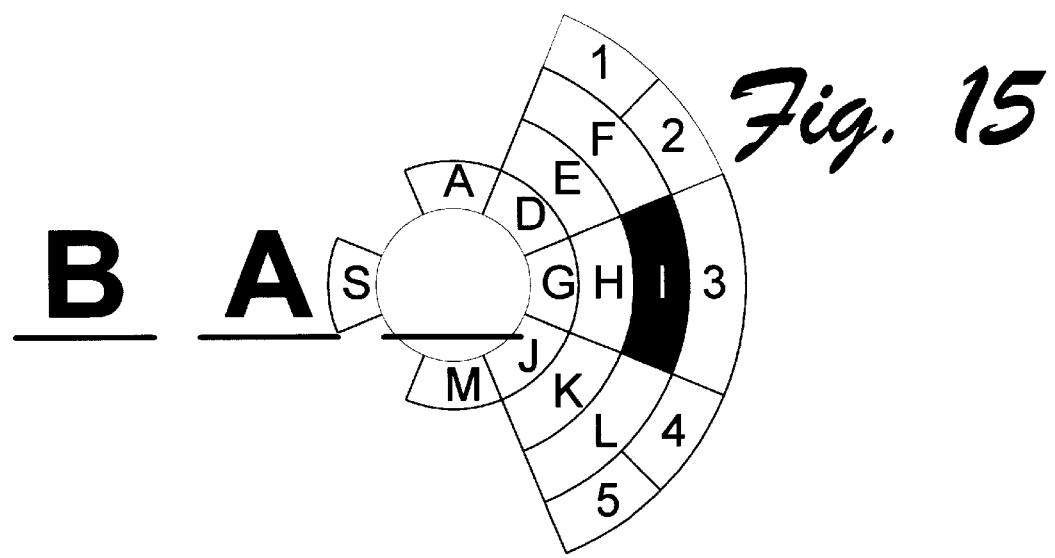
Figure 16:
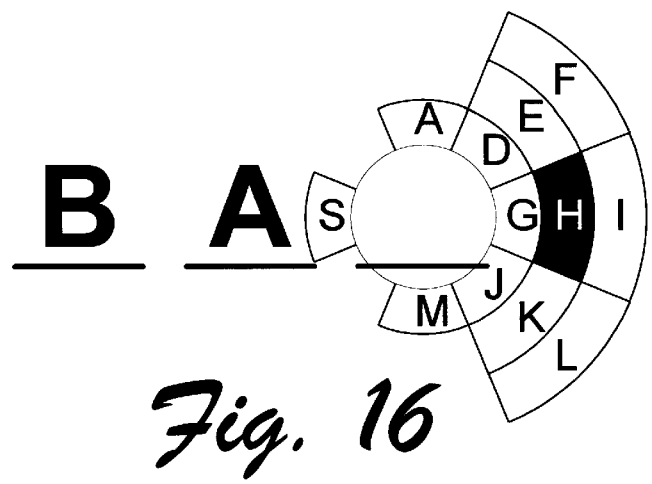

FIGS. 14–16 illustrate additional examples of moving the focus among the symbols of the symbol chart. From the position at "1", shown in FIG. 13, the user can move the focus to the "F" symbol by pressing the down key 45 (FIG. 14). From there, pressing the right key 47 moves the focus to the "I" symbol (FIG. 15). Pressing the left key 46 moves the focus from the "I" symbol to the "H" symbol (FIG. 16). The viewport follows the focus around the chart, so that the symbols nearest the current position of the focus remain visible. Specifically, the visible symbols include any symbols immediately neighboring the focus (including diagonal neighbors) and any symbols that are inward of such neighboring symbols. In addition, the "A", "G", "M", and "S" symbols are displayed whenever the symbol entry tool is activated.

Figure 17:
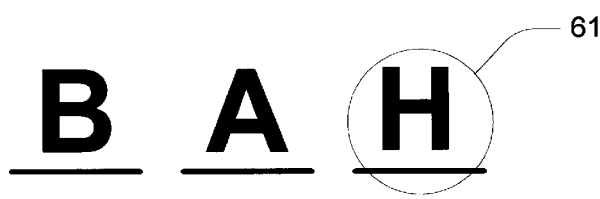

Pressing action key 48 at any time enters the currently focused symbol into the symbol entry region 62. The result of this step is shown in FIG. 17, where the user has pressed the action key when the focus was on the "H" symbol. Focus ring 61 can now be moved to other symbol entry regions by pressing the focus movement keys. The symbol entry tool can be activated again by pressing the action key.

While the invention has been described primarily in terms of its features and functionality, the invention also includes methodological steps used to implement such features and functionality, in addition to computer-readable media containing computer-executable instructions for executing such steps. The invention thus includes a step of arranging a plurality of symbols to at least partially surround a symbol entry area and moving a focus among the symbols in response to user commands. The focus moves in response to user activation of directional control keys on a remote command unit.

The invention further includes a step of displaying only a subset of the symbols. The subset preferably comprises those symbols that are near the focus. More specifically, the invention includes a step of displaying progressively more symbols as the focus moves away from the symbol entry area. This is accomplished by constructing a moveable viewport over the symbols, wherein the displayed subset of the symbols includes primarily those symbols within the viewport, and by expanding the viewport radially outward in response to moving the focus outward. A further step in accordance with the invention comprises moving the viewport in response to moving the focus. Specifically, this step involves revolving the viewport around the symbol entry area in response to moving the focus around the symbol entry area. A yet further step comprises entering a particular symbol that is the subject of the focus into the symbol entry area in response to user activation of an action key.

A number of enhancements to the described symbol chart have been found to be useful. One enhancement comprises adding directional indicators surrounding the focused symbol, indicating which focus movement keys should be used to move to adjoining symbols. Without such directional indicators, the chart can be somewhat unclear in this regard to first-time users, since adjacent symbols in some cases are positioned diagonally from each other. The indicators are not needed if the remote control unit has diagonal focus movement keys.

Figure 18:
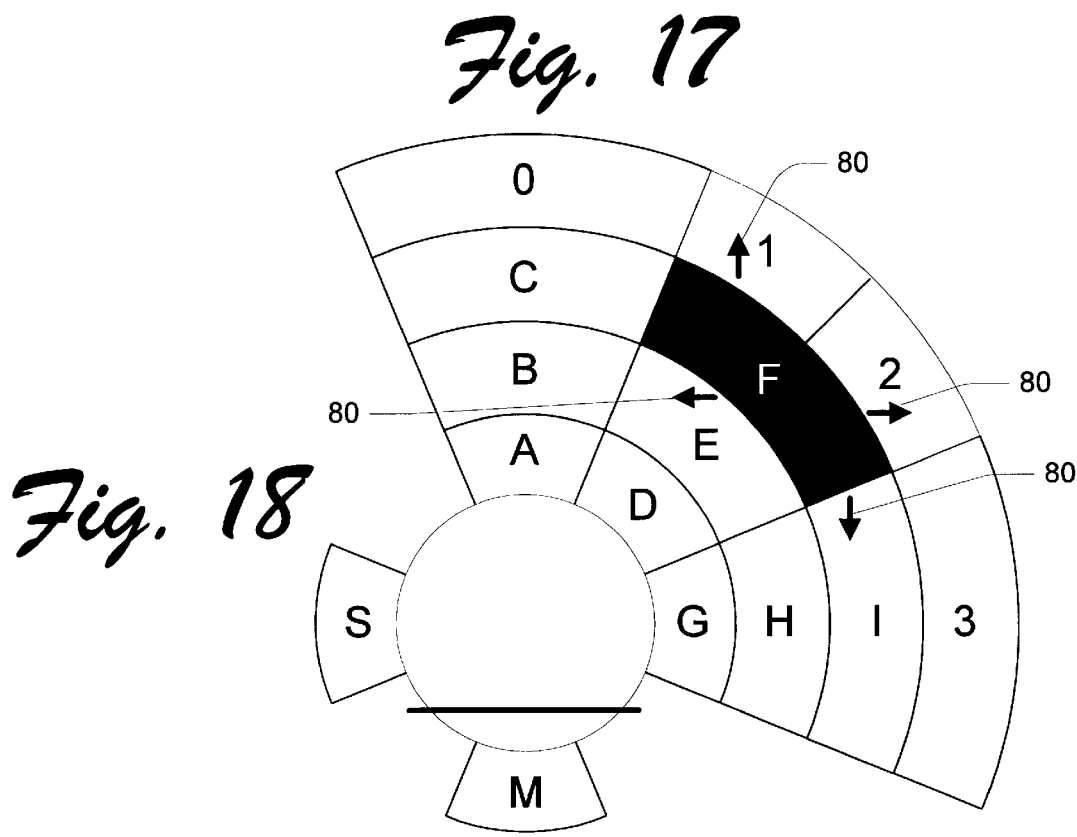
FIG. 18 illustrates features of an enhanced symbol entry tool.

FIG. 18 shows examples of directional indicators, labeled with reference numeral 80. A down arrow associated with an adjacent symbol indicates that the down key of remote control 36 should be pressed to move the focus to that symbol. Up, left, and right arrows correspond similarly to up, left, and right keys of remote control 36.

Another enhancement comprises adding conditional responses to focus movement keys, so that responses to focus movement keys are dependent on previous focus movements when the user is moving from a character that is within one of the four diagonal spokes of the character chart. It has been found that users expect to be able to move back to a previous character by pressing the opposite focus movement key. Thus, a user expects to be able to move from "B" to "E" with the right key and back to "B" with the left key.

Perhaps as a result of this expectation, a user expects to use a different focus movement key to move diagonally than was used to move into a diagonal spoke of the chart. Thus, if a user moves from "B" to "E" using the right key, the user would use the up key to move to "F". However, if a user moves from "H" to "E" using the up key, the user would press the right key in to move the focus to "F".

The user interface can be implemented to account for previous keystrokes when moving from a character that is in a diagonal spoke. After moving into a diagonal spoke by pressing one key, the opposite key will move back out of the spoke. A different key must be used to move along the diagonal spoke.

Other variations of the illustrated symbol chart are also possible, and will be desirable in some situations. One variation might place most frequently used symbols toward the middle of the chart. Another variation might let the user customize the location of characters. A still further variation might make all the symbols visible as soon as the focus moves in any direction. This allows for easier initial learning of character locations.

The invention solves the problems of the prior art. Specifically, the symbol chart disclosed herein is compact, requiring little space on the display surface, while requiring relatively few keystrokes to find any particular symbol. If desired, the symbol chart can have a transparent background so that it interferes only minimally with the underlying screen elements. Different colors can be used to further enhance the usefulness of the symbol chart, and to avoid obscuring underlying graphics.

Another advantage of the invention over the QWERTY-type chart described above is that this chart can be placed directly over the place where a character is to be entered. This avoids any disassociation of the text entry location from the process of selecting the text.

A further advantage of the invention is that selecting a particular character always begins from the same point (the symbol entry area), and the user moves the focus away from that point in a sequence that can be learned. Thus, the user can develop strategies for finding desired symbols using the shortest possible number of keystrokes and focus movements.

The invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A symbol entry tool for use on a graphical display surface, comprising:
   a symbol chart having a plurality of symbols that can be selected by a user;
   the symbols of the chart being arranged to form a plurality of approximately concentric rings around a symbol entry area, extending from an inner ring to an outer ring, wherein less than all of the rings are initially displayed;
   a visible focus that is responsive to user commands to move among the symbols;
   wherein moving the visible focus from a symbol in one ring to a symbol in a more outward ring causes an additional outward ring to be displayed.

2. A symbol entry tool as recited in claim 1, wherein moving the focus from a symbol in one ring to a symbol in a more inward ring causes a most outwardly displayed ring to be no longer displayed.

3. A symbol entry tool as recited in claim 1, wherein the symbols are alphanumeric characters.

4. A symbol entry system comprising:
   a graphical display surface;
   a remote command unit;
   a symbol entry tool as recited in claim 1 displayed on the graphical display surface;
   wherein the visible focus moves in response to commands given by the user through the remote command unit.

5. A symbol entry system comprising:
   a remote command unit having focus movement keys;
   a symbol entry tool as recited in claim 1 displayed on the graphical display surface;
   wherein the visible focus moves in response to activating the focus movement keys;
   wherein movement of the visible focus in response to a currently-activated focus movement key is dependent on a previously-activated focus movement key.

6. A symbol entry tool for use on a graphical display surface, comprising:
   a symbol chart having a plurality of symbols that can be selected by a user;
   the symbols of the chart being arranged to form a plurality of approximately concentric rings around a symbol entry area, the plurality of approximately concentric rings including one innermost ring and one or more outer rings, wherein only those characters coinciding with a wedge-shaped viewport are displayed;
   a visible focus that is responsive to user commands to move among the symbols; and
   wherein moving the visible focus from a symbol in one outer ring to a different symbol in the same outer ring causes the viewport to revolve around the symbol entry area in coincidence with the visible focus.

7. A symbol entry tool for use on a graphical display surface, comprising:
   a symbol chart having a plurality of symbols that can be selected by a user;
   the symbols of the chart being arranged to form a plurality of approximately concentric rings around a symbol entry area, wherein only those characters coinciding with a wedge-shaped viewport are displayed;
   a visible focus that is responsive to user commands to move among the symbols;
   wherein moving the visible focus from a symbol in one ring to a different symbol in the same ring causes the viewport to revolve around the symbol entry area in coincidence with the visible focus; and
   wherein moving the visible focus from a symbol in one ring to a different symbol in a more outward ring causes the viewport to expand radially.

8. A symbol entry tool for use on a graphical display surface, comprising:
   a symbol chart having a plurality of symbols that can be selected by a user;
   the symbols of the chart being arranged to form a plurality of approximately concentric rings around a symbol entry area, wherein only those characters coinciding with a wedge-shaped viewport are displayed;
   a visible focus that is responsive to user commands to move among the symbols;
   wherein moving the visible focus from a symbol in one ring to a different symbol in the same ring causes the viewport to revolve around the symbol entry area in coincidence with the visible focus; and
   wherein moving the visible focus from a symbol in one ring to a different symbol in a more inward ring causes the viewport to contract radially.

9. A symbol entry tool as recited in claim 6, wherein the symbols are alphanumeric characters.

10. A symbol entry system comprising:
    a graphical display surface;
    a remote command unit;
    a symbol entry tool as recited in claim 6 displayed on the graphical display surface;
    wherein the visible focus moves in response to commands given by the user through the remote command unit.

11. A symbol entry system comprising:
    a remote command unit having focus movement keys;
    a symbol entry tool as recited in claim 6 displayed on the graphical display surface;
    wherein the visible focus moves in response to activating the focus movement keys;
    wherein movement of the visible focus in response to a currently-activated focus movement key is dependent on a previously-activated focus movement key.

12. A method of symbol selection, comprising the following steps:
    arranging a plurality of symbols around a symbol entry area in a plurality of approximately concentric rings, wherein less than all of the rings are initially displayed;
    moving a focus among the symbols in response to user commands;
    displaying an additional outward ring in response to moving the focus from a symbol in one ring to a symbol in a more outward ring.

13. A method as recited in claim 12, further comprising the following additional step:
    causing a most outwardly displayed ring to no longer be displayed in response to moving the focus from a symbol in one ring to a symbol in a more inward ring.

14. A method as recited in claim 12, wherein the symbols are alphanumeric characters.

15. A method as recited in claim 12, further comprising the following additional step:

moving the focus in response to user activation of directional keys on a remote command unit.

16. A method as recited in claim 12, further comprising the following additional step:

moving the focus in response to user activation of a directional key, wherein the focus moves in a direction that depends on a previous directional key activation.

17. A method as recited in claim 12, further comprising the following additional step:

entering a particular symbol that is the subject of the focus into the symbol entry area in response to user activation of an action key.

18. A computer-readable storage medium having instructions for performing steps as recited in claim 12.

19. A method of symbol selection, comprising:

arranging a plurality of symbols around a symbol entry area in a plurality of approximately concentric rings, the plurality of approximately concentric rings including one innermost ring and one or more outer rings, wherein less than all of the rings are initially displayed;

moving a focus among the symbols in response to user commands;

constructing a viewport relative to the symbols;

displaying only those symbols coinciding with the viewport; and revolving the viewport around the symbol entry area in response to moving the visible focus from a symbol in one outer ring to a different symbol in the same outer ring.

20. A method of symbol selection, comprising:

arranging a plurality of symbols around a symbol entry area in a plurality of approximately concentric rings, wherein less than all of the rings are initially displayed;

moving a focus among the symbols in response to user commands;

constructing a viewport relative to the symbols;

displaying only those symbols coinciding with the viewport;

revolving the viewport around the symbol entry area in response to moving the visible focus from a symbol in one ring to a different symbol in the same ring; and expanding the viewport radially in response to moving the visible focus from a symbol in one ring to a different symbol in a more outward ring.

21. A method of symbol selection, comprising:

arranging a plurality of symbols around a symbol entry area in a plurality of approximately concentric rings, wherein less than all of the rings are initially displayed;

moving a focus among the symbols in response to user commands;

constructing a viewport relative to the symbols;

displaying only those symbols coinciding with the viewport;

revolving the viewport around the symbol entry area in response to moving the visible focus from a symbol in one ring to a different symbol in the same ring; and contracting the viewport radially in response to moving the visible focus from a symbol in one ring to a different symbol in a more inward ring.

22. A method as recited in claim 19, wherein the symbols are alphanumeric characters.

23. A method as recited in claim 19, further comprising moving the focus in response to user activation of directional keys on a remote command unit.

24. A method as recited in claim 19, further comprising moving the focus in response to user activation of a directional key, wherein the focus moves in a direction that depends on a previous directional key activation.

25. A method as recited in claim 19, further comprising entering a particular symbol that is the subject of the focus into the symbol entry area in response to user activation of an action key.

26. A computer-readable storage medium having instructions for performing steps as recited in claim 19.

27. A computer-readable storage medium having stored thereon a program comprising the following steps:

arranging a plurality of symbols around a symbol entry area in a plurality of approximately concentric rings, wherein less than all of the rings are initially displayed;

moving a focus among the symbols in response to user commands;

constructing a viewport relative to the symbols;

displaying only those symbols coinciding with the viewport;

revolving the viewport around the symbol entry area in response to moving the visible focus from a symbol in one ring to a different symbol in the same ring;

expanding the viewport radially in response to moving the visible focus from a symbol in one ring to a different symbol in a more outward ring;

contracting the viewport radially in response to moving the visible focus from a symbol in one ring to a different symbol in a more inward ring.

28. A computer-readable storage medium as recited in claim 27, wherein the symbols are alphanumeric characters.

29. A computer-readable storage medium as recited in claim 27, wherein the moving step is performed in response to user activation of directional keys on a remote command unit.

30. A computer-readable storage medium as recited in claim 27, wherein the moving step is performed in response to user activation of a directional key, wherein the focus moves in a direction that depends on a previous directional key activation.

31. A computer-readable storage medium as recited in claim 27, the program further comprising the following additional step:

entering a particular symbol that is the subject of the focus into the symbol entry area in response to user activation of an action key.

* * * * *